United States Patent [19]

Siegenthaler

[11] Patent Number: 5,460,685

[45] Date of Patent: Oct. 24, 1995

[54] INNER SUPPORTING UNIT FOR TOROIDAL CARCASSES

[75] Inventor: Karl J. Siegenthaler, Roma, Italy

[73] Assignee: Bridgestone Corporation, Tokyo, Japan

[21] Appl. No.: 343,692

[22] Filed: Nov. 22, 1994

[30] Foreign Application Priority Data

Dec. 31, 1993 [IT] Italy .................. T093A1027

[51] Int. Cl.⁶ .................................................. B29D 30/08
[52] U.S. Cl. ............................................ 156/420; 156/417
[58] Field of Search ..................... 156/415, 417, 156/414, 398, 420, 414, 416, 418, 419, 133, 406.2

[56] References Cited

U.S. PATENT DOCUMENTS

| | | | |
|---|---|---|---|
| 3,582,435 | 6/1971 | Frazier | 156/417 |
| 3,674,604 | 7/1972 | Gazuit | 156/417 |
| 3,767,509 | 10/1973 | Gazuit | 156/417 |
| 3,909,336 | 9/1975 | Takahashi et al. | 156/420 |
| 5,320,695 | 6/1994 | Siegenthaler | 156/127 |

Primary Examiner—Geoffrey L. Knable
Attorney, Agent, or Firm—Carmen Santa Maria

[57] ABSTRACT

An inner supporting unit (1) for toroidal carcasses (2), wherein a number of ring segments (23) define a first annular supporting element (24) for the intermediate annular portion (6) of the carcass (2); and two rings (25, 26) of supporting members (27) are selectively operable for supporting the beads (4) of the carcass. The segments (23) define a first (48) and second (49) number of segments (23) movable between an operating position wherein the two numbers (48, 49) of segments (23) define the first annular supporting element (24), and an idle position wherein the two numbers (48, 49) of segments (23) respectively define a second (52) and third (53) substantially annular element aligned with each other along an axis (9), the outside diameter of which is smaller than the inside diameter of the beads (4).

11 Claims, 4 Drawing Sheets

INNER SUPPORTING UNIT FOR TOROIDAL CARCASSES

BACKGROUND OF THE INVENTION

1. Technical Field

The present invention relates to an inner supporting unit for toroidal carcasses.

2. Background Information

European Patent Applications publication nos. 0549868 and 0549869 and European Patent Applications nos. 93110346.9 and 93111228.8 relate to the formation of a toroidal carcass comprising two beads with respective fillers; two sidewalls, each defined by a succession of loops formed using at least one cord and enclosing a respective bead and filler; and an intermediate annular portion preferably reinforced externally by a tread belt normally comprising reinforcing wires.

The above European Applications also relate to the formation of a toroidal carcass of the above type using a reinforcing structure defined by the two beads, which are subsequently incorporated into the carcass; and by an annular element located centrally and radially outwards in relation to the beads, for supporting an intermediate annular portion of the carcass. Once the carcass is complete, said annular element is required to support it during the formation of a reinforced tread belt on the outer surface of the carcass, and as the reinforced carcass is inserted inside an annular tread formed on the inner surface of a toroidal forming mold as described in European Patent Application publication no. 0540048. Finally, the annular element must be removed from the carcass for finishing it internally by inserting at least an impermeable innerliner.

SUMMARY OF THE INVENTION

It is an object of the present invention to provide a highly straightforward, functional supporting unit designed to support the beads during formation of the carcass, formation of the tread belt, and insertion of the carcass inside the tread in said toroidal forming mold; to define said inner annular element; and to enable removal of the annular element through one of the two beads upon completion of the above operations.

According to the present invention, there is provided an inner supporting unit for toroidal carcasses comprising an intermediate annular portion and two beads on either side of the intermediate annular portion. The unit comprises a number of ring segments movable into an operating position wherein each segment contacts and is aligned with two adjacent segments, to define a first annular supporting element for the intermediate annular portion of the toroidal carcass; and two rings of supporting elements on either side of said first annular element and coaxial with each other and with the axis of the first annular element, for supporting said two beads. The first annular element comprises at least a first and second number of said segments; a first and second transmission being connected respectively to said first and second number of segments, for moving the respective number of segments between said operating position and an idle position wherein said two numbers of segments respectively define a second and third substantially annular element aligned with each other along said axis, and having an outside diameter smaller than the inside diameter of said beads.

According to a preferred embodiment of the above supporting unit, each of said number of segments comprises alternate segments of said annular element.

BRIEF DESCRIPTION OF THE DRAWINGS

A non-limiting embodiment of the present invention will be described by way of example with reference to the accompanying drawings, in which.

DESCRIPTION OF THE PREFERRED EMBODIMENT

Figure 4:
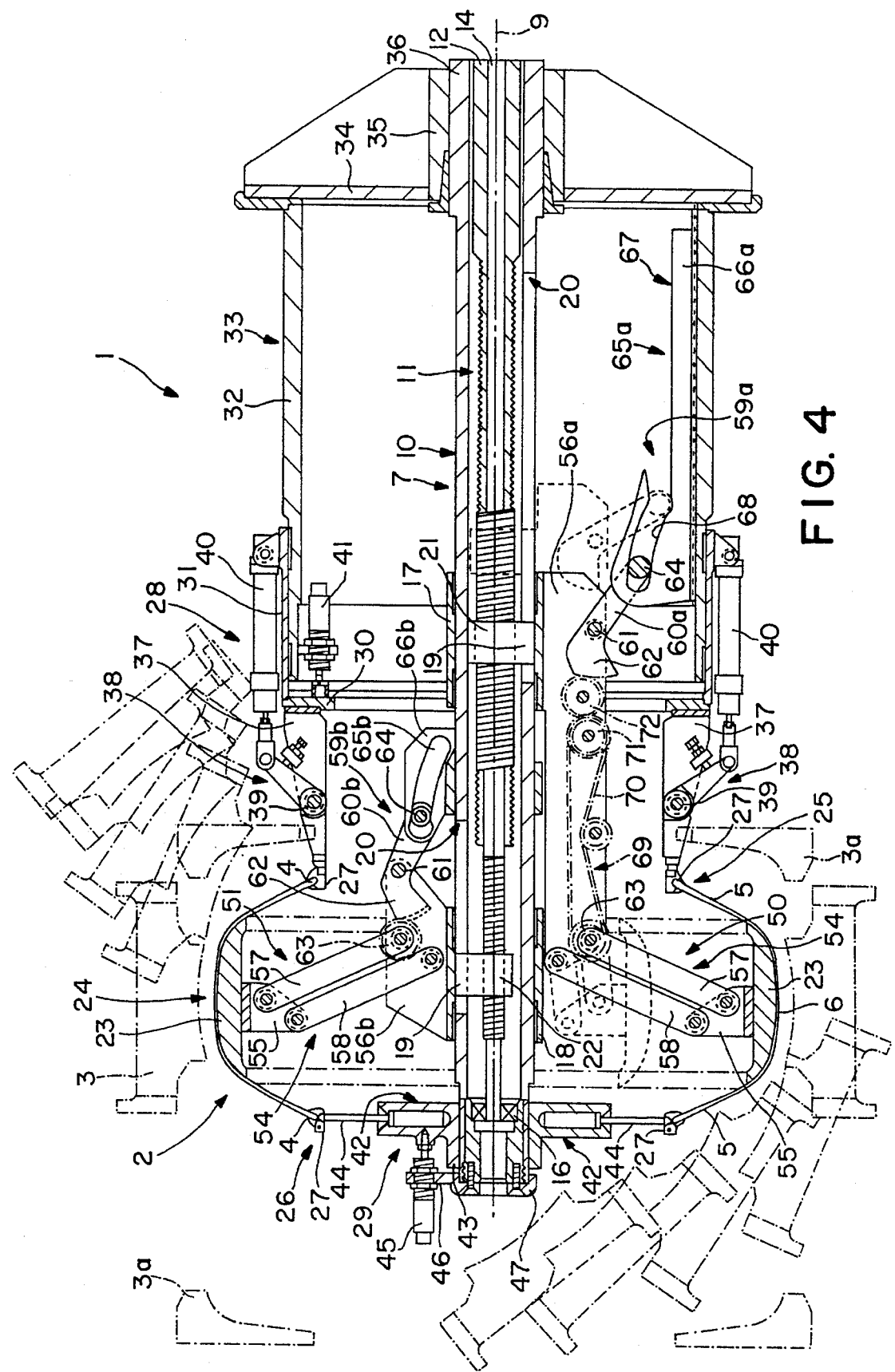
FIG. 4 shows a horizontal axial section of the FIG. 1 and 2 unit in the FIG. 2 position.

Number 1 in FIG. 4 indicates an inner supporting unit for a carcass 2 substantially formed as described in European Patent Application publication no. 0549868 and fittable inside a forming ring 3 housing a tread (not shown) and having detachable lateral walls 3a substantially as described in European Patent Application publication no. 0540048.

Carcass 2 comprises two beads 4 with respective fillers; two sidewalls 5, each defined by a succession of loops formed using at least one cord and enclosing a respective bead 4 and respective filler; and an intermediate annular portion 6 which may be reinforced externally by a tread belt (not shown).

Unit 1 comprises a central tubular guide shaft 7 projecting from a support (not shown) and connected to a motor 8 so as to rotate about its axis 9. Shaft 7 is defined externally by a cylindrical surface 10, and partially houses a drive 11 comprising a first tubular screw 12 coaxial with axis 9, extending along an initial portion of shaft 7, and connected to a motor 13 housed inside said support (not shown), so as to rotate about axis 9. A second screw 14 extends along screw 12, coaxially with axis 9, and is connected for rotation to screw 12. Screw 14 is connected to a motor 15 housed inside said support (not shown), so as to rotate about axis 9, and presents an end portion projecting from the free end of screw 12 towards the free end of shaft 7, and is fitted in a rotary manner to shaft 7 via the interposition of bearings 16.

Shaft 7 is fitted in a sliding manner with two tubular slides 17 and 18 coaxial with axis 9, and presents respective inner appendixes 19 parallel to axis 9 and engages in a transversely sliding manner, respective axial openings 20 formed through shaft 7. Appendixes 19 and respective slides 17 and 18 constitute the output members of drive 11, which also comprises two nut screws 21 and 22 fitted respectively to screws 12 and 14, and connected integral with the inner ends of respective appendixes 19.

Figure 1:
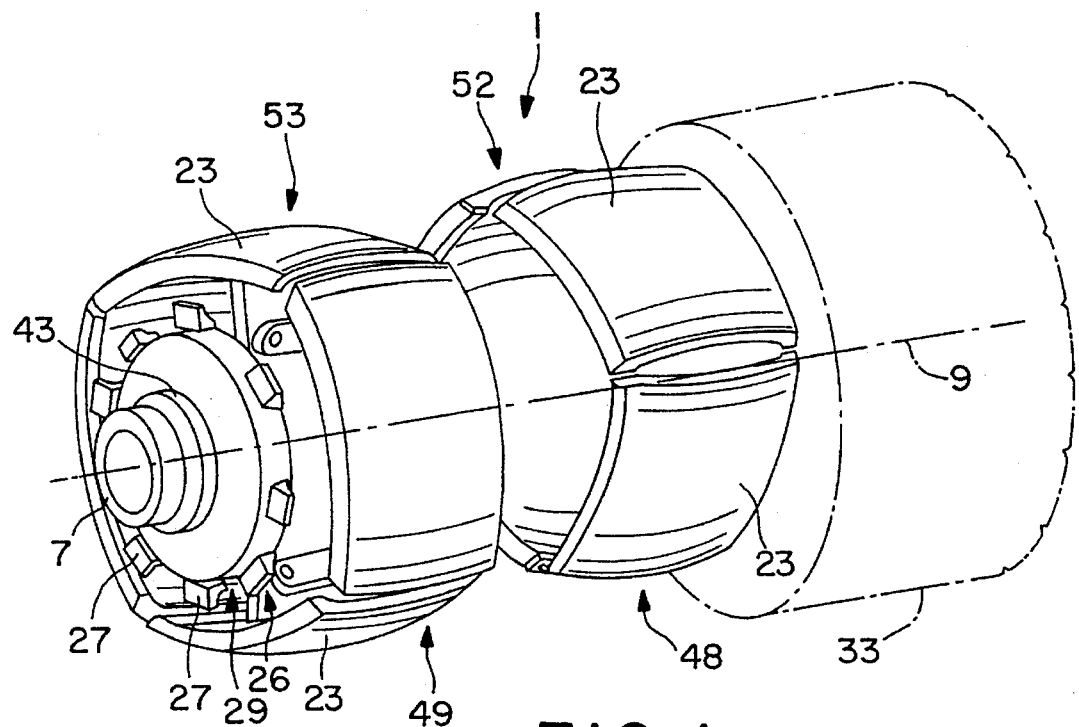
FIGS. 1 and 2 show partial views in perspective, with parts removed for clarity, of a preferred embodiment of the supporting unit according to the present invention in two different operating positions.
Figure 2:
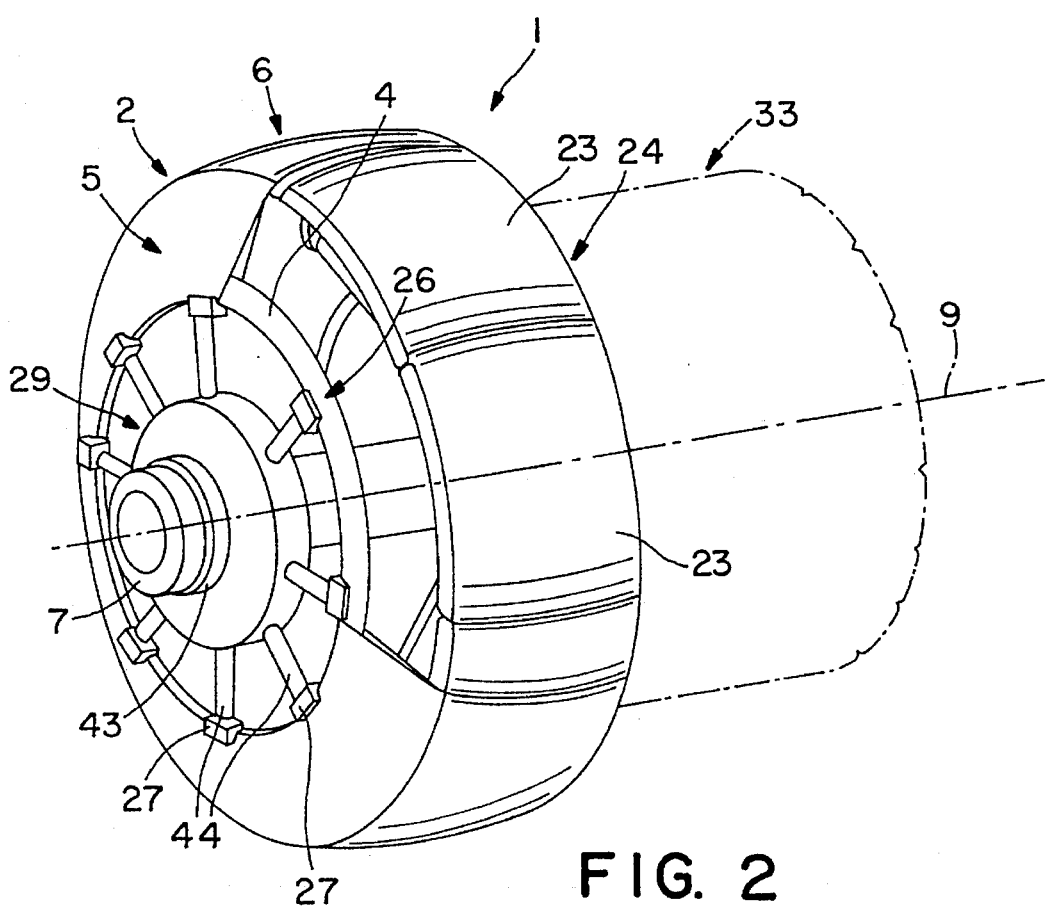

Unit 1 also comprises a number of ring segments 23 connected to drive 11 and movable into an operating position (FIGS. 2, 4 and 5) wherein each segment 23 contacts and is aligned with two adjacent segments 23 to define an annular element 24 coaxial with axis 9 and supporting intermediate annular portion 6 of toroidal carcass 2. Unit 1 also comprises two rings 25 and 26 of supporting elements 27, located on either side of annular element 24, coaxial with each other and with axis 9, for supporting the two beads 4 of carcass 2.

Figure 3:
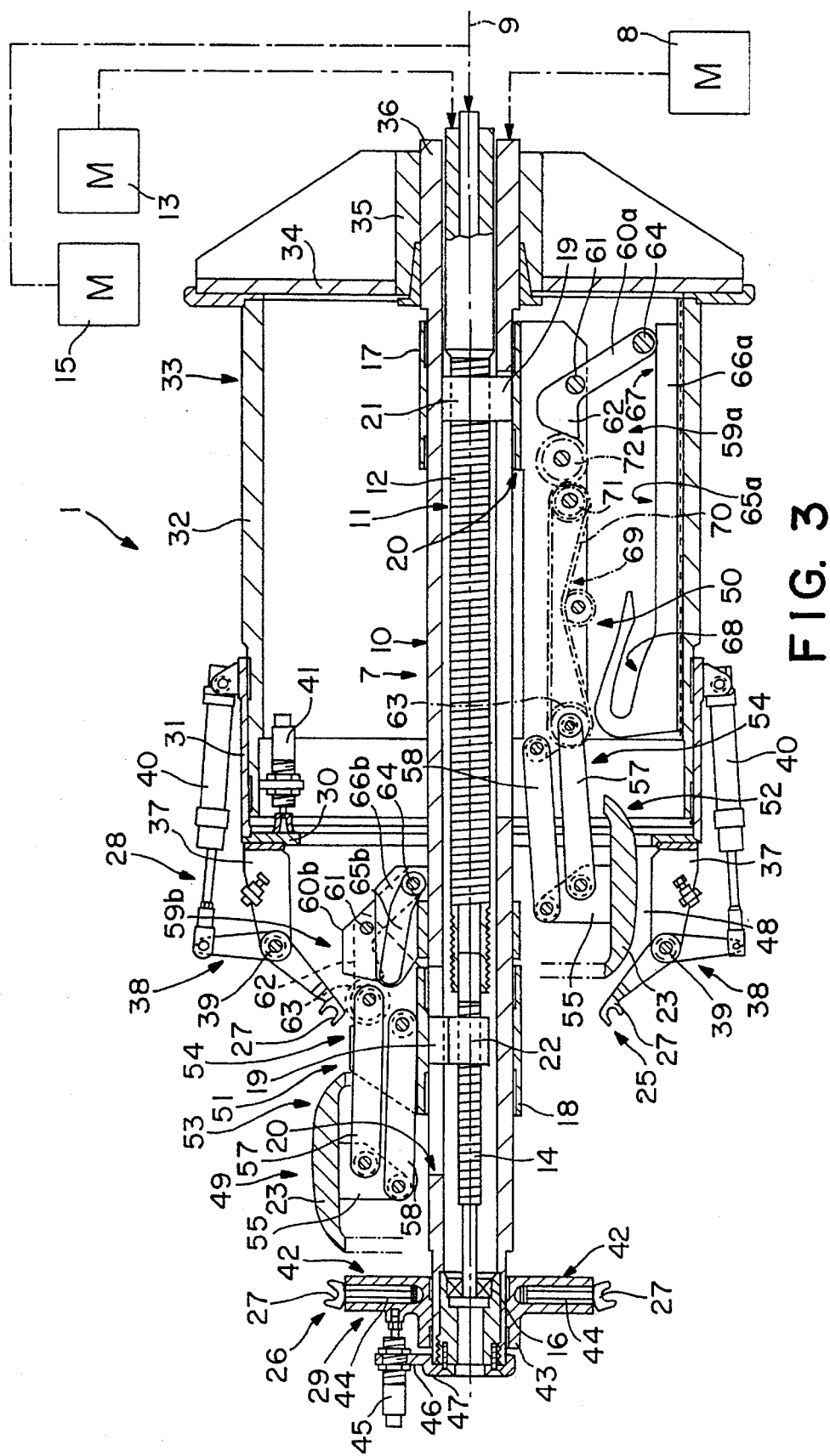
FIG. 3 shows a horizontal axial section of the FIG. 1 and 2 unit in the FIG. 1 position.

More specifically, and as shown in FIGS. 3 and 4, each supporting element 27 is substantially U-shaped and fitted to a respective actuating device indicated at 28, for ring 25, and at 29 for ring 26. Actuating devices 28 are equally spaced about the inner flange 30 of a ring 31 fitted in an axially sliding manner to the open end of a cylindrical lateral wall 32 of a cup-shaped body 33 surrounding the portion of shaft 7 extending between said shaft support (not shown) and annular element 24.

Body 33 is coaxial with axis 9, and comprises an end wall 34 perpendicular to axis 9 and is fitted with a sleeve 35 coaxial with axis 9 and force fitted onto the end portion 36 of shaft 7 opposite the free end of the shaft. Each actuating device 28 comprises a bracket 37 integral with flange 30 and parallel to axis 9; and a rocker arm 38 pivoting on the free end of respective bracket 37 about a pin 39, perpendicular to axis 9. Rocker arm 38 presents a first arm fitted on its free end with a respective supporting element 27; and a second arm connected by its free end to the output of a linear actuator 40 interposed between rocker arm 38 and ring 31, and selectively operable for moving respective supporting element 27 between an inner idle position (FIG. 3) and an outer operating position (FIG. 4). The axial position of ring 31 in relation to body 33 is defined by a linear actuator 41 interposed between wall 32 and flange 30, and operating parallel to axis 9 for moving respective bead 4 between a carcass forming position (FIG. 4) and a carcass shaping position (not shown).

Each actuating device 29 comprises a cylinder 42 extending radially outwards from a ring 43 fitted in an axially movable manner to shaft 7, close to the free end of the shaft. Each cylinder 42 comprises a radial output rod 44 fitted with a respective supporting element 27, and is selectively operable for moving respective supporting element 27 between an inner idle position (FIG. 3) and an outer operating position (FIG. 4). The axial position of ring 43 in relation to shaft 7 is defined by a linear actuator 45 which is interposed between ring 43 and a bracket 46 on a cap 47 fitted integral with the free end of shaft 7. Ring 43 operates parallel to axis 9 for moving respective bead 4 between a carcass forming position (FIG. 4) and a carcass shaping position (not shown).

Figure 5:
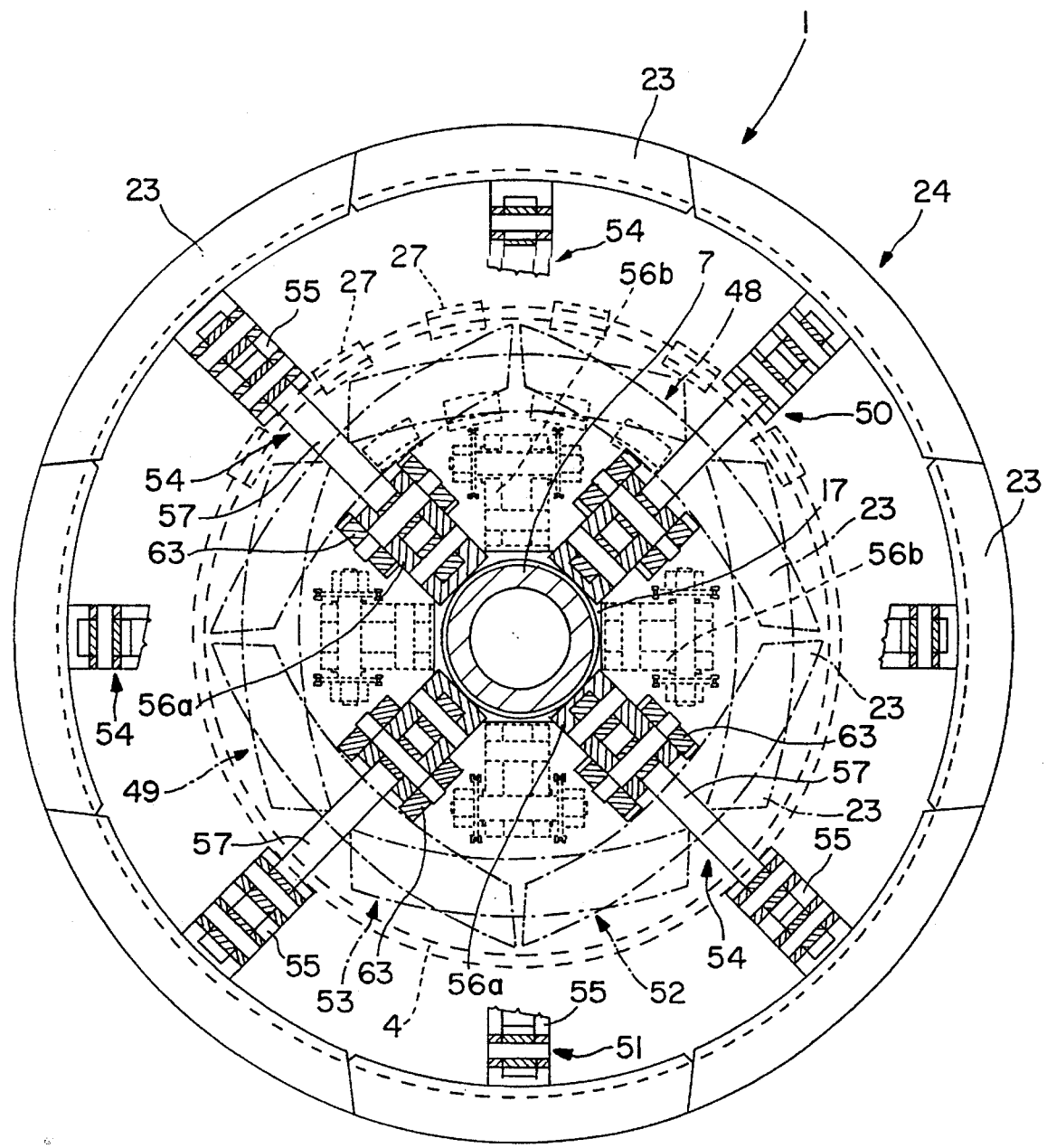
FIG. 5 shows a partially sectioned front view of the FIG. 4 unit with parts removed for clarity.

As shown clearly in FIGS. 3 and 5, alternate segments 23 of annular element 24 define two numbers 48 and 49 of segments 23 connected to drive 11 via the interposition of respective transmissions 50 and 51 respectively, which are connected to slides 17 and 18, and which provide for moving respective numbers 48 and 49 of segments 23 between said operating position and an idle position (shown in FIG. 3 and by the dotted line in FIG. 5), wherein segments 23 of said two numbers 48 and 49 define respective substantially annular elements 52 and 53 aligned along axis 9, and the outside diameters of which are smaller than the inside diameter of beads 4.

As shown more clearly in FIGS. 3 and 4, for each respective segment 23, each transmission 50 and 51 comprises an articulated parallelogram 54 movable in relation to shaft 7 in a radial plane in relation to axis 9. Each transmission comprises a connecting rod 55 consisting of an inner appendix of respective segment 23; a frame 56 (indicated 56a for segments 23 in number 48, and 56b for segments 23 in number 49) consisting of a blade lying in a plane through axis 9 and integral with the outer surface of respective slide 17, 18; and two cranks 57 and 58 connecting the opposite ends of connecting rod 55 to the corresponding ends of frame 56.

For each respective segment 23, each transmission 50 and 51 also comprises an activating device 59 (indicated 59a for segments 23 in number 48, and 59b for segments 23 in number 49) connected to crank 57, for moving connecting rod 55 and respective segment 23 between said idle and operating positions. Each device 59 comprises a rocker arm 60 (indicated 60a for segments 23 in number 48, and 60b for segments 23 in number 49) pivoting on respective frame 56 about a pin 61 perpendicular to axis 9, and presenting two arms on either side of pin 61. The first arm defines a sector gear 62 meshing with a gear 63 rotating with crank 57 in relation to frame 56, and the second arm supports in an idle manner a tappet roller 64 mating with a cam 65 (indicated 65a for segments 23 in number 48, and 65b for segments 23 in number 49) formed in a plate 66 (indicated 66a for segments 23 in number 48, and 66b for segments 23 in number 49) fixed in relation to shaft 7.

More specifically, plate 66a is fitted integral with the inner surface of wall 32. Respective cam 65a presents a first portion 67 parallel to axis 9, and a second portion 68 in the form of a ramp converging towards axis 9. Frame 56a extends from respective slide 17 towards the free end of shaft 7, and supports a transmission 69 comprising a chain 70 looped about respective gear 63, and about a further gear 71 meshing with a gear 72 fitted idly to frame 56a and meshing with sector gear 62 of respective rocker arm 60a. Plate 66b, on the other hand, is fitted directly on to shaft 7, is much shorter than plate 66a, and presents a cam 65b comprising only a ramp similar to portion 68 of cam 65a. Also, sector gear 62 of rocker arm 60b meshes directly with respective gear 63.

Operation of unit 1 will now be described in an initial position (FIG. 3) wherein the two numbers 48 and 49 of segments 23 define respective annular elements 52 and 53 aligned along axis 9, with element 52 withdrawn along shaft 7 in relation to element 53, and substantially inside flange 30 of ring 31. For this purpose, slides 17 and 18 are withdrawn by drive 11 towards portion 36 of shaft 7.

In the above initial position, supporting elements 27 in rings 25 and 26 are set to the inner idle position by respective actuating devices 28 and 29, and at the same time are set by actuators 41 and 45 to the maximum distance along axis 9, i.e. to the forming position.

In connection with the above, it should be pointed out that, when slide 17 is moved towards the free end of shaft 7, roller 64 of activating device 59a, initially travels along straight portion 67 of cam 65a, so that the whole of annular element 52 travels forward and remains in the initial position until roller 64 reaches ramp portion 68. At this point, as slide 17 continues moving forward, roller 64 travels along portion 68 towards axis 9, so that rocker arm 60a and respective sector gear 62 rotate anticlockwise (in FIGS. 3 and 4) about respective pin 61; gear 72 is rotated clockwise; and chain 70, respective gear 63, and respective cranks 57 and 58 of respective parallelogram 54 rotate anticlockwise, so that respective connecting rod 55 and respective segment 23 move away from axis 9 into the outer operating position in FIG. 4.

Similarly, when slide 18 is moved towards the free end of shaft 7, roller 64 of activating device 59b travels along the ramp portion of cam 65b away from axis 9, so that rocker arm 60b and respective sector gear 62 rotate anticlockwise (in FIGS. 3 and 4) about respective pin 61. Respective gear 63 and respective cranks 57 and 58 of respective parallelogram 54 rotate clockwise, so that respective connecting rod 55 and respective segment 23 move away from axis 9 into the outer operating position in FIG. 4.

In other words, when motors 13 and 15 are operated as of said initial position in FIG. 3, slides 17 and 18 are moved differently but both towards the free end of shaft 7, so that segments 23 are all moved into the outer operating position. The travel distance of slides 17 and 18 is so calculated that segments 23 in said two numbers 48 and 49 are aligned in a plane perpendicular to axis 9, to form annular element 24.

Formation of annular element 24 is followed immediately by extraction of supporting elements 27, which engage respective beads 4 prior to reaching the outer operating position, and by weaving or interconnection of carcass 2.

In connection with the above, it should be pointed out that annular element 24 formed by segments 23, in the operating position, presents a relatively small amount of clearance between adjacent segments 23, and, as shown clearly in FIG. 4, rollers 64 and hence slides 17 and 18 are stopped short of the end-of-travel position. When inserting carcass 2 inside forming ring 3, in much the same way as for inserting the inner ring of a bearing inside the outer ring, rollers 64 are first backed up further to slightly reduce the outside diameter of carcass 2. Once the carcass is inserted inside forming ring 3, actuators 41 and 45 are activated to bring beads 4 slightly closer together into the shaping position. Rollers 64 are moved forward into the end-of-travel position to shape carcass 2 against the tread (not shown) inside ring 3, and take up any slack in sidewalls 5 caused when beads 4 are brought together.

Carcass 2 is removed from unit 1 by restoring slides 17 and 18, devices 28 and 29, and actuators 41 and 45 to their original positions, and by axially moving ring 3 so as to withdraw unit 1 completely from carcass 2 through the bead 4 closest to cup-shaped body 33.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

What is claimed is:

1. An inner supporting unit for toroidal carcasses having an intermediate annular portion and two beads on either side of the intermediate annular portion; the unit comprising a number of ring segments movable into an operating position wherein each segment contacts and is aligned with two adjacent segments, to define a first annular supporting element for the intermediate annular portion of the toroidal carcass; two rings of supporting members on either side of said first annular element and coaxial with each other and with the axis of the first annular element, for supporting said two beads; said first annular element comprising at least a first and a second number of said segments; a first and a second transmission being connected respectively to said first and second number of segments, for moving the respective number of segments between said operating position and an idle position wherein said two numbers of segments respectively define a second and third substantially annular element aligned with each other along said axis, and having an outside diameter smaller than the inside diameter of said beads.

2. A unit as claimed in claim 1, in which each of said number of segments comprises alternate segments of said first annular element.

3. A unit as claimed in claim 1, in which each of said transmissions comprises an articulated parallelogram, in turn comprising at least one connecting rod defined by the segment itself, and at least one crank; and in which an activating device is connected to said crank, for moving said connecting rod between said idle and operating positions.

4. A unit as claimed in claim 3, in which said activating device comprises a cam, and a tappet member connected to said crank.

5. A unit as claimed in claim 4, in which said cam is axially fixed along said axis.

6. A unit as claimed in claim 5, in which each of said articulated parallelograms comprises a frame movable parallel to said axis; drive means being connected to said activating device, for moving said frame along said axis and between a withdrawn idle position and a forward operating position; and said tappet member being movable with said frame along said axis.

7. A unit as claimed in claim 6, in which the tappet member comprises a rocker arm pivoting on said frame, and in turn comprising a first and second arm; the first arm being connected to said cam; and transmission means being provided for connecting the second arm to said crank.

8. A unit as claimed in claim 7, in which said transmission means comprises first teeth formed on the second arm, about the pivot of said rocker arm; and second teeth formed about the pivot of said crank on said frame; the second teeth being integral with the crank, and being rotated by the first teeth about said pivot of said crank when the frame is moved along said axis by said drive means.

9. A unit as claimed in claim 6, including a motor for rotating said first annular supporting element and said two rings of the supporting members about said axis.

10. A unit as claimed in claim 1, in which each of said supporting members is so mounted as to be selectively movable, in a substantially radial direction in relation to said axis, between an outer operating position supporting a respective one of said beads, and an inner idle position.

11. A unit as claimed in claim 1, including actuating means for moving said two rings of the supporting members along said axis.

* * * * *

REEXAMINATION CERTIFICATE (3735th)

United States Patent [19]

Siegenthaler

[11] B1 5,460,685

[45] Certificate Issued Feb. 16, 1999

[54] INNER SUPPORTING UNIT FOR TOROIDAL CARCASSES

[75] Inventor: Karl J. Siegenthaler, Rome, Italy

[73] Assignee: Bridgestone Corporation, Tokyo, Japan

Reexamination Request:
No. 90/004,853, Nov. 26, 1997

Reexamination Certificate for:
Patent No.: 5,460,685
Issued: Oct. 24, 1995
Appl. No.: 343,692
Filed: Nov. 22, 1994

[30] Foreign Application Priority Data

Dec. 31, 1993 [IT] Italy ................... TO93A1027

[51] Int. Cl.[6] .................................................. B29D 30/08
[52] U.S. Cl. ................................... 156/420; 156/417
[58] Field of Search ........................... 156/414, 415, 156/416, 417, 418, 419, 420, 398, 403, 406.2, 133

[56] References Cited

U.S. PATENT DOCUMENTS

| | | | |
|---|---|---|---|
| 1,358,941 | 11/1920 | Denmire | 154/9 |
| 2,132,834 | 10/1938 | Stevens | 154/9 |
| 2,149,604 | 3/1939 | Johnson | 154/9 |
| 2,325,001 | 7/1943 | McLaughlin | 154/9 |
| 3,556,900 | 1/1971 | Edney et al. | 156/403 |

FOREIGN PATENT DOCUMENTS 202895  8/1923  United Kingdom.

*Primary Examiner*—Geoffrey L. Knable

[57] ABSTRACT

An inner supporting unit (1) for toroidal carcasses (2), wherein a number of ring segments (23) define a first annular supporting element (24) for the intermediate annular portion (6) of the carcass (2); and two rings (25, 26) of supporting members (27) are selectively operable for supporting the beads (4) of the carcass. The segments (23) define a first (48) and second (49) number of segments (23) movable between an operating position wherein the two numbers (48, 49) of segments (23) define the first annular supporting element (24), and an idle position wherein the two numbers (48, 49) of segments (23) respectively define a second (52) and third (53) substantially annular element aligned with each other along an axis (9), the outside diameter of which is smaller than the inside diameter of the beads (4).

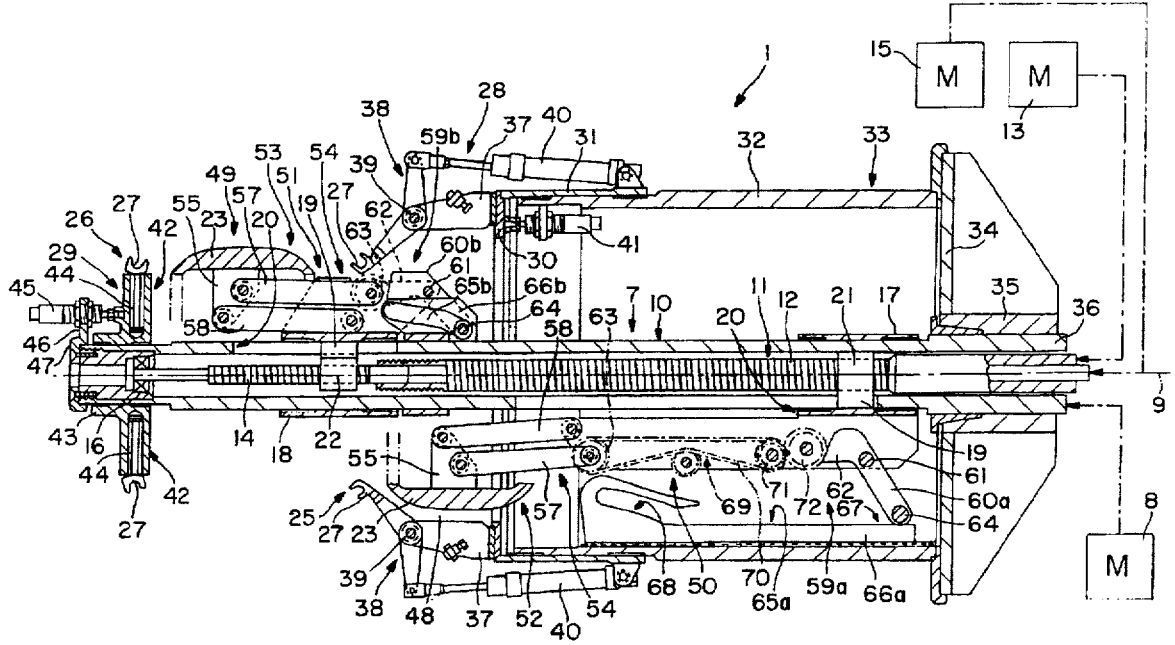

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2 and 3 are cancelled.

Claims 4, 10 and 11 are determined to be patentable as amended.

Claims 5–9, dependent on an amended claim, are determined to be patentable.

New claim 12 is added and determined to be patentable.

4. [A unit as claimed in claim 3, in which] *An inner supporting unit for toroidal carcasses having an intermediate annular portion and two beads on either side of the intermediate annular portion; the unit comprising a number of ring segments movable into an operation position wherein each segment contacts and is aligned with two adjacent segments, to define a first annular supporting element for the intermediate annular portion of the toroidal carcass; two rings of supporting members on either side of said first annular element and coaxial with each other and with the axis of the first annular element, for supporting said two beads; said first annular element comprising at least a first and a second number of said segments; a first and a second transmission being connected respectively to said first and second number of segments for moving the respective number of segments between said operating position and an idle position wherein said two numbers of segments respectively define a second and third substantially annular element aligned with each other along said axis, and having an outside diameter smaller than the inside diameter of said beads;*
   *each of said number of segments comprising alternate segments of said first annular element;*
   *each of said transmissions comprising an articulated parallelogram, in turn comprising at least one connecting rod defined by the segment itself, and at least one crank; and in which an activating device is connected to said crank, for moving said connecting rod between said idle and operating positions;*
   said activating device [comprises] *comprising* a cam, and a tappet member connected to said crank.

10. A unit as claimed in claim [1] *4*, in which each of said supporting members is so mounted as to be selectively movable, in a substantially radial direction in relation to said axis, between an outer operating position supporting a respective one of said beads, and an inner idle position.

11. A unit as claimed in claim [1] *4* including actuating means for moving said two rings of the supporting members along said axis.

*12. An inner supporting unit for toroidal carcasses having an intermediate annular portion and two beads on either side of the intermediate annular portion; the unit comprising a number of ring segments movable into an operating position wherein each segment contacts and is aligned with two adjacent segments, to define a first annular supporting element for the intermediate annular portion of the toroidal carcass; first and second rings of supporting members on either side of said first annular element and coaxial with each other and with the axis of the first annular element, for supporting said two beads; said first annular element comprising at least a first and a second number of said segments; a first and a second transmission being connected respectively to said first and second number of segments, for moving the respective number of segments between said operating position and an idle position wherein said two numbers of segments respectively define a second and third substantially annular element aligned with each other along said axis, and having an outside diameter smaller than the inside diameter of said beads;*

*each of said supporting members being mounted so as to be selectively movable in a substantially radial direction in relation to said axis between an outer operating position supporting a respective one of said beads and an inner idle position;*

*a first linear actuator for moving said first ring of supporting members along said axis and a second linear actuator for moving said second ring of supporting members along said axis;*

*second actuating means for moving said first ring of supporting members radially between said outer operating position and said inner idle position, said second actuating means including extendable and retractable cylinders carried by a first ring, said first ring being slidable axially with respect to said first annular supporting element, said first linear actuator connected to said first ring; said first ring disposed inside the outside diameter of said second and third substantially annular elements; and*

*third actuating means for moving said second ring of supporting members radially between said outer operating position and said inner idle position, said third actuating means including a third linear actuator connected at one end to a first end of a rocker arm and connected at a second end to a second ring having a flange; said rocker arm having a second end that is connected to said second ring of supporting members, said rocker arm pivotally carried by a bracket that is carried by said flange; said flange and said second ring being connected to said second linear actuator with said flange and said second ring being slidable with respect to said first annular supporting element; said flange and said second ring being disposed outside the outside diameter of said second and third substantially annular elements.*

* * * * *